United States Patent Office 3,751,383
Patented Aug. 7, 1973

3,751,383
METHOD OF PREPARING A CATALYST FOR THE HYDROREFINING OF RESIDUAL OILS
Mark J. O'Hara, Mount Prospect, Ill., assignor to Universal Oil Products Company, Des Plaines, Ill.
No Drawing. Filed Dec. 6, 1971, Ser. No. 205,339
Int. Cl. B01j 11/22, 11/40
U.S. Cl. 252—455 R      5 Claims

ABSTRACT OF THE DISCLOSURE

A method of preparing a hydrorefining catalyst for the conversion of $C_7$-insoluble asphaltenes and sulfurous components in a residual oil. The catalyst comprises a refractory inorganic oxide carrier material impregnated with a metal of Groups VI-B and VIII. Improved activity and stability results from novel calcining procedures.

---

The present invention relates to an improved catalyst particularly useful in the hydrorefining of residual oils produced as a result of separating lighter fractions from petroleum crude oils. The residual oils are variously referred to as asphaltum oil, liquid asphalt, black oil, petroleum trailings, residuum, residual reduced crude, bunker fuel oils, etc. Residual oils normally contain nitrogenous and sulfurous compounds, and heptane-insoluble asphaltenes which, alone or in combination, seriously impair the conversion of said oils to lower boiling more useful fractions thereof.

The nitrogeneous and sulfurous compounds can be reduced to an exceptable level at hydrorefining conditions whereby they are converted to ammonia and hydrogen sulfide and readily separated as gaseous products. The reduction of heptane-insoluble asphaltenes is substantially more difficult. The heptane-insouble asphaltenes which occur in residual oils comprise a significant fraction thereof. For example, a Wyoming sour crude oil having an API gravity of 23.2° at 16° C. has been shown to contain about 8.37 wt. percent pentane-insoluble asphaltenes. These compounds tend to deposit within a reaction zone and on the catalyst situated therein forming a gummy hydrocarbonaceous residue which functions as a coke precursor. The deposition of this residue constitutes a significant loss of products and it is economically desirable to convert such asphaltenes into useful hydrocarbon fractions.

The hydrorefining process herein contemplated affords the advantage of converting heptane-insoluble asphaltenes into heptane-soluble hydrocarbons. The catalyst of this invention effects said conversion at hydrorefining conditions without incurring the relatively rapid deposition of coke and other hydrocarbonaceous matter. Further, depending on process conditions and the character of the residual oil being processed, a substantial portion of the feed stock can be simultaneously hydrocracked to yield gasoline, kerosine, fuel oil or other valuable liquid products.

It is an object of this invention to provide an improved catalyst particularly adapted to the hydrorefining of residual oils. It is a further object to present a hydrorefining process for the conversion of residual oils to lower boiling petroleum products of reduced asphaltene content.

In one of its broad aspects, the present invention embodies a method of preparing a hydrorefining catalyst which comprises impregnating a refractory inorganic oxide carrier material with an aqueous solution of a soluble compound of a metal of Groups VI-B and VIII, drying the resulting composite, and calcining the dried composite in an oxygen-containing atmosphere at a temperature in the range of from about 550° to about 650° C. for a period of at least about one hour and until such time as said composite no longer suffers a weight loss at said temperature. Other objects and embodiments of this invention will become apparent in the following detailed specification.

The catalyst support or carrier material treated in accordance with the method of this invention is most suitably a refractory inorganic oxide such as alumina, silica, zirconia, thoria, boria, etc., or composites thereof including alumina-silica, alumina-zirconia, and the like. The carrier material is preferred to comprise alumina composited with one or more other refractory inorganic oxides. A carrier material comprising alumina in at least an equimolar amount with silica is particularly desirable. Thus, a carrier material comprising about 88 wt. percent alumina composited with about 12 wt. percent silica is a particularly effective carrier material. The carrier material is further enhanced by the inclusion of boron phosphate, especially in the case of the preferred alumina-silica composite. Thus, a carrier material comprising about 68 wt. percent alumina, 10 percent silica and about 22 wt. percent boron phosphate is advantageously employed.

The carrier material is preferably prepared to embody the most advantageous physical properties with respect to the hydrorefining process herein contemplated, said properties including a surface area of from about 120 to about 220 m.²/gm., an average pore diameter of from about 70 to about 120 angstroms, and an average pore volume of from about 0.3 to about 0.5 cc./gm. The preferred alumina-silica carrier material may be prepared by commingling an aqueous water glass solution with an aluminum chloride hydrosol, or other aluminum salt solution, the resulting mixture being added to a suitable alkaline precipitant, such as ammonium hydroxide, to coprecipitate the hydrogel composite of alumina and silica. The gel is water-washed, filtered and slurried in an aqueous solution of phosphoric and boric acids, the latter being utilized in about equimolar amounts and in a total amount to yield a finished carrier material containing from about 13 wt. percent to about 35 wt. percent boron phosphates. The boron phosphate-containing material is dried and formed into the desired size and/or shape and subsequently calcined.

One preferred method of preparing alumina-silica carrier materials, which affords a convenient means of developing the desired physical characteristics, relates to the cogelation of an alumina sol and a silica sol to form spheroidal particles utilizing the well-known oil drop method. Thus, an alumina sol, suitably prepared by digesting aluminum pellets in aqueous hydrochloric acid solution, is commingled with a silica sol, suitably prepared by the acidification of water glass as is commonly practiced, and the sol blend dispersed as droplets in a hot oil bath whereby gelation occurs with the formation of spheroidal particles. In this type of operation, the silica is set thermally, the alumina being set chemically utilizing ammonia as a neutralizing or setting agent. Usually the ammonia is is furnished by an ammonia precursor which is included in the sol. The ammonia precursor is suitably urea, hexamethylenetetramine, or mixtures thereof, although other weakly basic materials which are substantially stable at normal temperatures but hydrolyzable to ammonia with increasing temperature may be employed. Only a fraction of the ammonia precursor is hydrolyzed or decomposed in the relatively short period during which initial gelation occurs. During the subsequent aging process, the residual precursor retained in the spheroidal gel particles continues to hydrolyze and effect further polymerization of the alumina-silica whereby the pore characteristics of the composite are established. The alumina-silica particles are aged, usually for a period of from about 10 to about 24 hours, at a predetermined temperature, usually from about 50 to about 105° C., and at a predetermined pH value. The aging time may be substantially reduced utilizing the pressure aging techniques with alumina-silica ratios in the higher range, pressure aging tends toward lower apparent bulk densities.

As previously stated, the foregoing method affords a convenient means of developing the desired physical characteristics of the carrier material. The method includes a number of process variables which effect the physical properties of the alumina-silica composite. However, it should be noted that a particular process variable will not necessarily be as effective to produce a desired result with one alumina-silica ratio as with another. Generally, the aluminum-chloride ratio of the alumina sol will influence the average bulk density of the alumina-silica product and, correspondingly, the pore volume and pore diameter characteristics attendant therewith, lower ratios tending toward higher average bulk densities. Other process variables effecting the physical properties of the catalyst support include the time, temperature and pH at which the particles are aged. Usually, the temperatures in the lower range and shorter aging periods tend toward higher average bulk densities. Surface area properties are normally a function of calcination temperature, a temperature of from about 425° to about 815° C. being suitably employed. Prior to calcination, the alumina-silica spheres are advantageously treated with an aqueous solution of phosphoric and boric acids as hereinabove described.

It is the usual practice to deposit catalytically active metallic components on a support or carrier material by the method whereby a soluble compound of the desired metallic component is impregnated on the carrier material from an aqueous solution. The soluble compound serves as a precursor of the metallic component such that, upon subsequent heating of the impregnated carrier material at temperatures effecting decomposition of said compound, the desired metallic component forms deposited on the carrier material. The hydrorefining catalyst of this invention is preferred to contain metallic components comprising a metal of Group VI-B and Group VIII. Thus, the catalyst composite may comprise chromium, molybdenum and/or tungsten in combination with one or more metals of Group VIII, i.e., iron, nickel, cobalt, platinum, palladium, ruthenium, rhodium, osmium and iridium. The aqueous impregnating solution will thus comprise a soluble precursor compound of a Group VI-B metal. Suitable compounds include ammonium molybdate, ammonium peramolybdate, molybdic acid, ammonium chromate, ammonium peroxychromate, chromium acetate, chromous chloride, chromium nitrate, ammonium metatungstate, tungstic acid, etc. The impregnating solution is suitably a common solution of a Group VI-B metal compound and a Group VIII metal compound. Suitable soluble compounds of Group VIII metals include nickel nitrate, nickel sulfate, nickel chloride, nickel bromide, nickel fluoride, nickel iodide, nickel acetate, nickel formate, cobaltous nitrate, cobaltous sulfate, cobaltous fluoride, ferric fluoride, ferric bromide, ferric nitrate, ferric sulfate, ferric formate, ferric acetate, platinum chloride, chloroplatinic acid, chloropalladic acid, palladium chloride, etc. Of the Group VI-B metals, molybdenum is preferred. The Group VI-B metal is suitably employed in an amount to comprise from about 10 to about 20 wt. percent of the final catalyst composite. The Group VIII metal, which is preferably nickel, is effective in an amount comprising from about 1.0 to about 5 wt. percent of the final catalyst composite.

Impregnation of the carrier material can be accomplished by conventional techniques whereby the carrier material is soaked, dipped, suspended or otherwise immersed in the impregnating solution at conditions to adsorb a soluble compound comprising the desired catalytic components. Certain impregnating techniques have been found to be particularly favorable to promote the desired physical properties of the finished catalyst. Thus, impregnation of the Group VI-B and Group VIII metal components is preferably from a common aqueous ammoniacal solution of soluble compounds thereof, for example, an ammoniacal solution of molybdic acid and nickel nitrate. Further, the impregnation is preferably effected utilizing a minimal volume of impregnating solution commensurate with an even distribution of the catalytic components on the carrier material. One preferred method involves the use of a steam jacketed rotary dryer. The carrier material is immersed in the impregnating solution contained in the dryer and the carrier material tumbled therein by the rotating motion of the dryer, the volume of the carrier material so treated being initially in the range of from about 0.7 to about 1.0 with respect to the volume of impregnating solution. Evaporation of the solution in contact with the carrier material is expedited by applying steam to the dry jacket. The evaporation is further facilitated by a continuous purge of the dryer utilizing a flow of dry gas, suitably air or nitrogen.

The impregnated carrier material is typically dried at a temperature of from about 95° to about 125° C., and thereafter calcined in an oxygen-containing atmosphere at a temperature of from about 425° to about 815° C. for a period of from about 1 to about 8 hours or more, said conditions of time and temperature being without regard to the quantity of catalyst being oxidized. It has now been found that said conditions of time and temperature do not necessarily produce a catalyst of optimum activity and stability. It has been discovered that a significant improvement is realized when the catalyst is heated in an oxygen-containing atmosphere, suitably air, at a calcination temperature in the more limited range of from about 550° to about 650° C., provided that said calcination is effected over a period of at least about one hour and until the catalyst no longer suffers a loss in weight at said temperature.

The hydrorefining process, utilizing the catalyst prepared in accordance with the method of the present invention, is effected by reacting the residual oil and hydrogen in contact with said catalyst. The charge stock and hydrogen mixture is heated to the operating temperature within the range of from about 225° to about 500° C. and contacts the catalyst under an imposed pressure of from about 500 to about 5000 p.s.i.g. The total reaction zone product effluent is passed into a suitable high pressure, low temperature separator from which a gaseous phase rich in hydrogen is removed and recycled to combine with fresh hydrocarbon charge. The remaining normally liquid product effluent is then introduced into a suitable fractionator or stripping column for the purpose of removing hydrogen sulfide and light hydrocarbons including methane, ethane, and propane. Although the normally gaseous phase from the high pressure separator may be treated for the purpose of removing the ammonium formed as a result of the destructive removal of nitrogenous compounds, a more convenient method involves the introduction of water upstream from the high pressure separator, removing said water and absorbed ammonia via suitable liquid level control means disposed in said pressure separator.

The following example is presented in illustration of the method of this invention and is not intended as an undue limitation on the generally broad scope of the invention as set out in the appended claims.

An alumina-silica composite was impregnated with an aqueous solution of boric and phosphoric acids and dried and calcined to yield a carrier material comprising 68 wt. percent alumina, 10 wt. percent silica and 22 wt. percent boron phosphate. The carrier material was thereafter impregnated with a common ammoniacal solution of molybdic acid and nickel nitrate in sufficient quantity to deposit 2 wt. percent nickel and 16 wt. percent molybdenum on the carrier material. The last mentioned impregnating solution was prepared by dissolving 123.2 grams of 85% molybdic acid and 215 milliliters of water and 140 milliliters of a 28% aqueous ammonium hydroxide solution, and adding thereto 43.2 grams of nickel nitrate hexahydrate dissolved in 34 milliliters of a 28% aqueous ammonium hydroxide solution. The impregnating solution was diluted to 585 milliliters with water and 320 grams of carrier material immersed therein in a rotary steam dryer. The carrier material was soaked in the solution for about 10 minutes at ambient temperature and the solution thereafter evaporated to dryness over a period of about 1.5 hours. The impregnated material was oven-dried an additional hour at 125° C.

The dried catalyst was calcined in air for one hour at 590° C. after which a sample was recovered and hereinafter referred to as catalyst A. A portion of the remaining catalyst, 212 grams after said calcination, was further calcined in air at 590° C. for an additional 1½ hour after which the catalyst weighed 211.3 grams. After two hours of calcination the catalyst weighed 210.5 grams, and there was no further weight loss upon subsequent calcination in air at said temperature. This catalyst is hereinafter referred to as catalyst B.

The catalysts thus prepared were evaluated by processing a crude tower bottoms over the catalyst at an inlet temperature of 380° C. and a peak bed temperature of about 425° C. The charge stock, characterized by an API at 60° F. of 13.1, 7.1% $C_7$-insoluble asphaltenes and 3.7% sulfur, was processed over the catalyst at a liquid hourly space velocity of 1.0 under 3000 p.s.i.g. hydrogen, the hydrogen being recycled at a rate of 15,000 cubic feet per barrel of charge stock.

The first described catalyst A effected a 71.6% conversion of $C_7$-insoluble asphaltenes, while the second described catalyst B effected a 77.3% conversion. Similarly, catalyst A accomplished an 82.7% conversion of sulfur as compared with an 84.3% conversion with catalyst B. All conversion figures were taken after about 35 hours on stream at the described hydrorefining conditions.

The foregoing example involves the preparation of relatively small quantities of catalyst exhibiting relatively small losses in weight over relatively brief oxidation periods. However, it will be appreciated that the improvement resulting from the practice of this invention will be much more apparent in the commercial manufacture of such catalyst where the loss in weight will be much more substantial and require substantially longer periods of exposure to calcination conditions to achieve optimum activity and stability.

I claim as my invention:
1. A method of preparing a hydrorefining catalyst adapted for the hydrorefining of residual oils containing sulfur and heptane-insoluble asphaltenes said catalyst displaying a higher order of concomitant sulfur and heptane-insoluble asphaltene conversion which method comprises impregnating a refractory inorganic oxide carrier material with an aqueous solution of a soluble compound of a metal of Groups VI–B and VIII, drying the resulting composite, and calcining the dried composite, said calcination consisting of calcining in an oxygen-containing atmosphere at a temperature in the range of from about 550° to about 650° C. for a period of at least about one hour and until such time as said composite no longer suffers a weight loss at said temperature.

2. The method of claim 1 further characterized in that said refractory inorganic oxide is a composite of alumina and silica.

3. The method of claim 2 further characterized in that said aqueous solution is a common solution of a soluble compound of molybdenum and a soluble compound of nickel.

4. The method of claim 3 further characterized in that said composite of alumina and silica comprises alumina in at least an equimolar amount composited with silica.

5. The method of claim 4 further characterized in that said common solution comprises a soluble compound of molybdenum and a soluble compound of nickel in a concentration sufficient to insure a catalyst composite comprising from about 5 to about 20 wt. percent molybdenum and from about 0.1 to about 10 wt. percent nickel.

References Cited
UNITED STATES PATENTS

| | | | |
|---|---|---|---|
| 3,471,399 | 10/1969 | O'Hara | 252—458 X |
| 3,496,117 | 2/1970 | Vesely et al. | 252—458 X |

CARL F. DEES, Primary Examiner

U.S. Cl. X.R.

252—458, 459